United States Patent
Choi et al.

(10) Patent No.: US 11,972,698 B2
(45) Date of Patent: Apr. 30, 2024

(54) PORTABLE BLOOD VESSEL MODEL SIMULATION APPARATUS FOR SIMULATION BLOOD VESSEL MODEL SUCH AS SURGERY, PUMP UNIT FOR CIRCULATING BLOOD VESSEL MIMICK LIQUID STORED IN BLOOD VESSEL MIMICK LIQUID TANK UNIT

(71) Applicant: THE CATHOLIC UNIVERSITY OF KOREA INDUSTRY-ACADEMIC COOPERATION FOUNDATION, Seoul (KR)

(72) Inventors: Jai Ho Choi, Seoul (KR); Yong Sam Shin, Gyeongsangnam-do (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 314 days.

(21) Appl. No.: 17/618,286

(22) PCT Filed: Sep. 22, 2020

(86) PCT No.: PCT/KR2020/012780
§ 371 (c)(1),
(2) Date: Dec. 10, 2021

(87) PCT Pub. No.: WO2021/153875
PCT Pub. Date: Aug. 5, 2021

(65) Prior Publication Data
US 2022/0366812 A1 Nov. 17, 2022

(30) Foreign Application Priority Data

Jan. 30, 2020 (KR) .................. 10-2020-0010944

(51) Int. Cl.
G09B 23/30 (2006.01)
G09B 9/00 (2006.01)
G09B 23/28 (2006.01)

(52) U.S. Cl.
CPC .................. *G09B 23/303* (2013.01)

(58) Field of Classification Search
CPC .... G09B 23/303; G09B 23/285; G09B 23/34; G09B 23/28; G09B 23/288; G09B 9/00;
(Continued)

(56) References Cited

U.S. PATENT DOCUMENTS 10,127,838 B2 * 11/2018 Tassone ............. A61B 34/10
2018/0144826 A1    5/2018 Christiansen et al.

FOREIGN PATENT DOCUMENTS

EP          2772897 A1 * 9/2014  .......... G09B 23/285
JP       2014-170075 A    9/2014
(Continued)

*Primary Examiner* — Brandi N Hopkins
(74) *Attorney, Agent, or Firm* — Bridgeway IP Law Group, PLLC; Jihun Kim

(57) ABSTRACT

A blood vessel model simulation apparatus for conducting a test or a simulation surgery on a blood vessel model, including: a blood vessel model mounting unit on which a blood vessel model is mounted to allow a blood-mimicking liquid flow; a blood-mimicking liquid tank unit that is integrally attached to the blood vessel model mounting unit and stores a blood-mimicking liquid which is to be supplied to the blood vessel model mounted on the blood vessel model mounting unit; a pump unit that circulates the blood-mimicking liquid stored in the blood-mimicking liquid tank unit via the blood vessel model; and a pump control unit that controls drive of the pump unit. The units are configured to be integrally coupled to each other such that the blood vessel model simulation apparatus has a reduction in size and weight to be mobile.

8 Claims, 6 Drawing Sheets

(58) Field of Classification Search
CPC ........ G09B 23/30; G16H 50/00; G16H 50/50;
G16B 5/00; A61F 2/2472; G01M 99/008;
G01M 13/00; Y02A 50/30; A61B 3/0025;
A61B 17/00; G06F 19/12
See application file for complete search history.

(56) References Cited

FOREIGN PATENT DOCUMENTS

| | | |
|---|---|---|
| JP | 2017-003637 A | 1/2017 |
| KR | 20-0405783 Y1 | 1/2006 |
| KR | 10-2016-0127456 A | 11/2016 |
| KR | 10-1871097 B1 | 6/2018 |
| KR | 10-1937110 B1 | 1/2019 |
| KR | 10-1949846 B1 | 2/2019 |
| WO | WO-2016075732 A1 * 5/2016 ........... G06T 7/0012 |

* cited by examiner

PORTABLE BLOOD VESSEL MODEL SIMULATION APPARATUS FOR SIMULATION BLOOD VESSEL MODEL SUCH AS SURGERY, PUMP UNIT FOR CIRCULATING BLOOD VESSEL MIMICK LIQUID STORED IN BLOOD VESSEL MIMICK LIQUID TANK UNIT

TECHNICAL FIELD

The present invention relates to a blood vessel model simulation apparatus, and more specifically, to a blood vessel model simulation apparatus which enables a test or a simulated surgery to be conducted on a cerebral blood vessel model.

BACKGROUND ART

Until recently, blood vessel-related diseases have been known to develop from an organic cause; however, recently, the diseases are reported to be acquired or degenerative lesions due to hemodynamic changes and stress, and diseases in the blood vessel are reported to be deeply connected to a shape of a blood vessel in which the diseases develop.

Consequently, in order to prevent, diagnose, and treat a patient's blood vessel-related diseases, a check on blood flow or a simulation test such as a surgery simulation needs to be performed after making a blood vessel model which is an imitation of a patient's blood vessel and can reliably show the diseases. Hence, a need for a blood vessel model as an imitation of a real blood vessel of a patient who has a blood vessel disease is increased, and the related art such as Korean Patent Registration Nos. 10-1949846 and 10-1937110 disclosed technologies for manufacturing a blood vessel model. In addition, the current development of 3D printing technology enables a patient's blood vessel model to be easily made by applying 3D printing thereto when an accurate STL file containing 3D blood vessel wall model data of a patient having a blood vessel disease is acquired.

A blood vessel model manufactured according to the technologies of the related art described above is manufactured by imitating a blood vessel of an individual patient, and then the blood vessel model can be applied to a simulation for surgery or a blood vessel surgical-training education simulation before actual surgery on a target patient.

In order to perform a pre-surgery simulation using the blood vessel model, a blood vessel model simulation apparatus, which enables a blood-mimicking liquid to circulate and enables a surgery to be simulated after the blood vessel model is mounted, is used.

Korean Utility Model Registration No. 20-0405783 discloses a phantom device including a fluid circulating system as an example of the blood vessel model simulation apparatus in the related art described above.

However, the blood vessel model simulation device in the related art such as the phantom device disclosed in Prior Art Literature has a configuration in which a pump, a blood-mimicking liquid storing unit, and a blood vessel model mounting box are provided separately from each other. Hence, since pipes become complex due to connection between the pump and the simulation device and blood-mimicking liquid often leaks as many pipe connections are formed, a test or a surgery simulation using a blood vessel model is difficult to perform, the device is large-sized and heavy, and an additional circulation pump and an auxiliary container for storing a supplemental blood-mimicking liquid need to be carried to supplement the blood-mimicking liquid. Hence, problems arise in that usability and portability of the simulation device are remarkably lowered.

PRIOR ART LITERATURE

Korean Patent Registration No. 10-1949846
Korean Patent Registration No. 10-1937110
Korean Utility Model Registration No. 20-0405783

SUMMARY OF INVENTION

Technical Problem

Consequently, the present invention is made to solve the problems in the related art described above, and an object of the present invention is to provide a blood vessel model simulation apparatus that is decreased in size and weight by being manufactured in one piece to be easily portable and can easily control circulation of a blood-mimicking liquid such that portability and usability thereof are remarkably improved.

Solution to Problem

In order to achieve the above-described technical object, according to an embodiment of the present invention, there is provided a blood vessel model simulation apparatus including: a blood vessel model mounting unit on which a blood vessel model is mounted to allow a blood-mimicking liquid flow; a blood-mimicking liquid tank unit that is integrally attached to the blood vessel model mounting unit and stores a blood-mimicking liquid which is to be supplied to the blood vessel model mounted on the blood vessel model mounting unit; a pump unit that circulates the blood-mimicking liquid stored in the blood-mimicking liquid tank unit via the blood vessel model; and a pump control unit that controls drive of the pump unit. The units are configured to be integrally coupled to each other.

The blood-mimicking liquid tank unit may be configured to include a step portion at which the blood vessel model mounting unit is formed at one side portion of the blood-mimicking liquid tank unit such that the blood vessel model mounting unit and the blood-mimicking liquid tank unit are integrally coupled to each other to form a hexahedron together.

The pump unit may be mounted inside the blood-mimicking liquid tank unit.

The pump control unit may be configured to control the drive of the pump unit so as to control at least one of supply, block, flow speed adjustment, flow rate adjustment, or flow pressure adjustment of the circulated blood-mimicking liquid.

The blood vessel model simulation apparatus may be configured to further include an auxiliary tank unit that supplies and supplements a blood-mimicking liquid to the blood-mimicking liquid tank unit through a supplement pipe formed at the blood-mimicking liquid tank unit in order to supplement a blood-mimicking liquid in the blood-mimicking liquid tank unit.

The auxiliary tank unit may be configured to be attachable to and detachable from the blood-mimicking liquid tank unit.

The auxiliary tank unit may be configured to include an upper opening portion which is closed or opened simultaneously by a tank door which closes the upper opening portion of a blood-mimicking liquid tank which configures the blood-mimicking liquid tank unit.

The auxiliary tank unit may be configured to include an auxiliary tank door which is closed independently from the blood-mimicking liquid tank that configures the blood-mimicking liquid tank unit, and the auxiliary tank unit may be mounted or coupling-attached to the blood-mimicking liquid tank only when needed to supplement and supply a blood-mimicking liquid.

The supplement pipe and the auxiliary tank unit may be configured to each include a check valve which is opened and closed such that the blood-mimicking liquid tank unit and the auxiliary tank unit communicate with each other, when the auxiliary tank unit is attached to the blood-mimicking liquid tank unit through the supplement pipe.

Advantageous Effects of Invention

A blood vessel model simulation apparatus according to an embodiment of the present invention described above is manufactured in one piece, small in size, and lightweight so as to be easily portable, and can easily control circulation of a blood-mimicking liquid such that an effect of remarkable improvement in usability is obtained.

In addition, in the blood vessel model simulation apparatus according to the embodiment of the present invention, a pump unit is mounted inside a blood-mimicking liquid tank unit and a blood vessel model mounting unit and the blood-mimicking liquid tank unit are integrally formed such that an effect is obtained in that the external appearance of the blood vessel model simulation apparatus is simplified, the size and the weight thereof are remarkably reduced, and thus portability and usability thereof are remarkably improved.

In addition, the blood vessel model simulation apparatus according to the embodiment of the present invention does not have a connection portion except for a coupled portion of a blood vessel model to an auxiliary tank unit and a coupled portion between a discharge pipe of the blood vessel model and a collection pipe of a blood-mimicking liquid tank, and thus a number of connection parts for forming a flow channel of a blood-mimicking liquid can be minimized to minimize leakage of the blood-mimicking liquid. Hence, effects are obtained in that use stability is remarkably improved and an optimal simulation can be performed.

DESCRIPTION OF EMBODIMENTS

In the following description of the present invention, when the detailed description of a known function or configuration related to the present invention is deemed to result in obscuring the gist of the present invention unnecessarily, the detailed description thereof will be omitted.

Embodiments according to the concept of the present invention can be variously modified and can include various examples, and thus specific embodiments are to be illustrated on the drawings and described in detail in this specification or this application. However, this does not mean that the embodiments according to the concept of the present invention are limited to a specific disclosed example, but is to be construed to mean that the present invention includes every modification, equivalent, and alternative included in the technical idea and technical scope of the present invention.

The description in which one configurational element is "connected to" or "coupled to" another configurational element is to be understood to mean that the one configurational element can be directly connected to or coupled to the other configurational element, or still another configurational element can be present therebetween. On the other hand, the description in which one configurational element is "directly connected to" or "directly coupled to" another configurational element is to be understood to mean that no configurational element is present therebetween. The same is true of other terms, that is, "between" and "directly between", "adjacent" and "directly adjacent", or the like for describing relationships between configurational elements.

Terms used in this specification are only used to describe a specific embodiment and are not intentionally used to limit the present invention thereto. A term in a singular form also has a meaning of its plural form unless obviously implied otherwise in context. In this specification, terms such as "to comprise" or "to include" are to be construed to specify that a feature, a number, a step, an operation, a configurational element, a member, or a combination thereof described here is present and not to exclude presence or a possibility of addition of one or more additional features, numbers, steps, operations, configurational elements, members, or combinations thereof in advance.

Hereinafter, the present invention will be described in more detail with reference to the accompanying drawings illustrating embodiments of the present invention.

Figure 1:
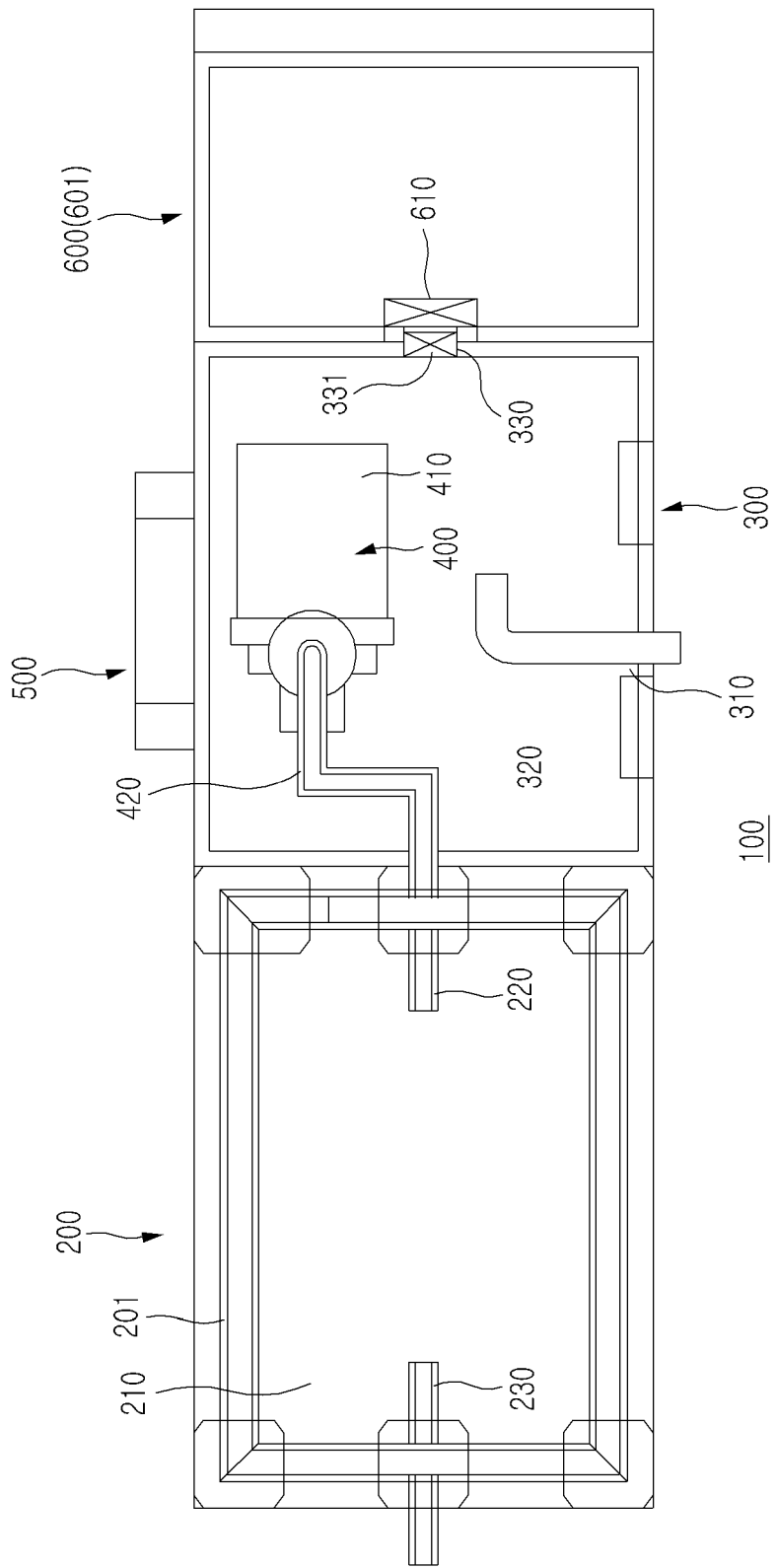
FIG. 1 illustrates a cross-sectional view from top of a blood vessel model simulation apparatus 100 according to an embodiment of the present invention.
Figure 2:
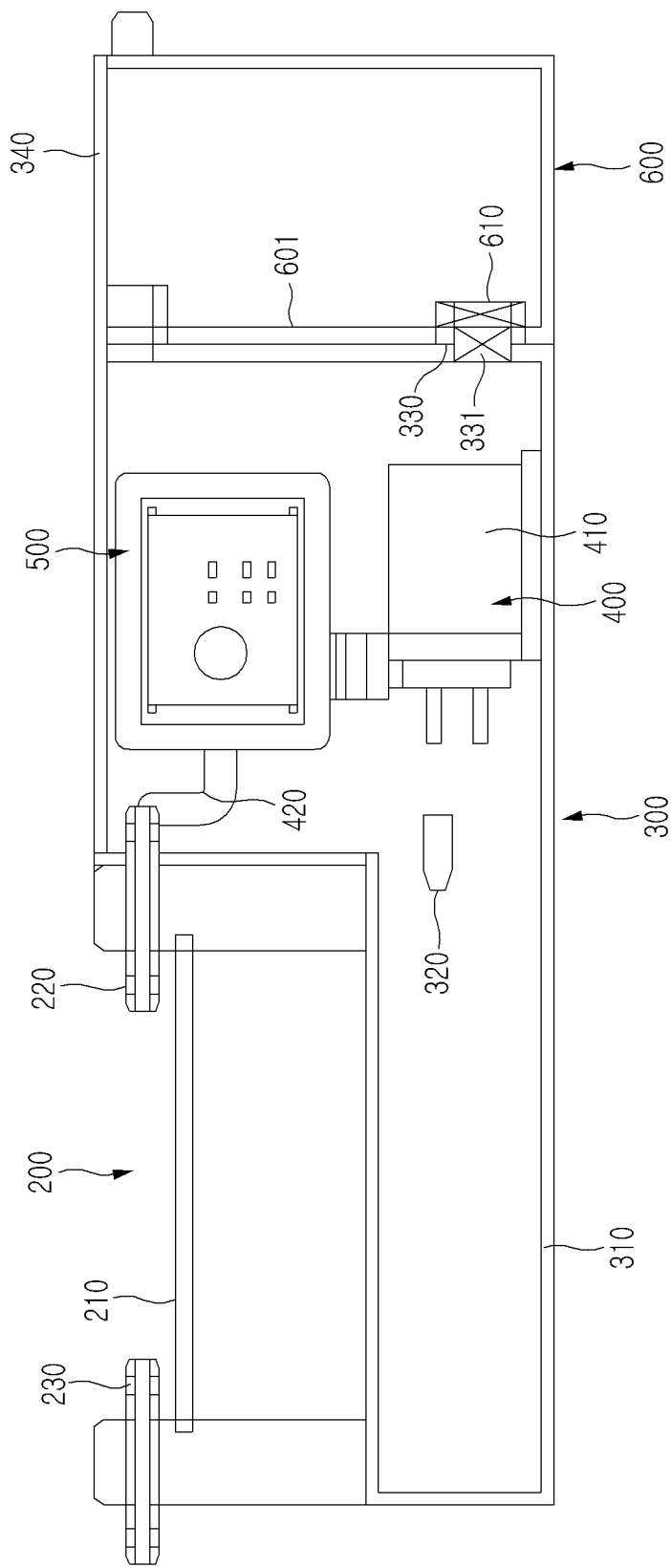
FIG. 2 illustrates a cross-sectional view from a right-hand side of the blood vessel model simulation apparatus 100 in FIG. 1.
Figure 3:
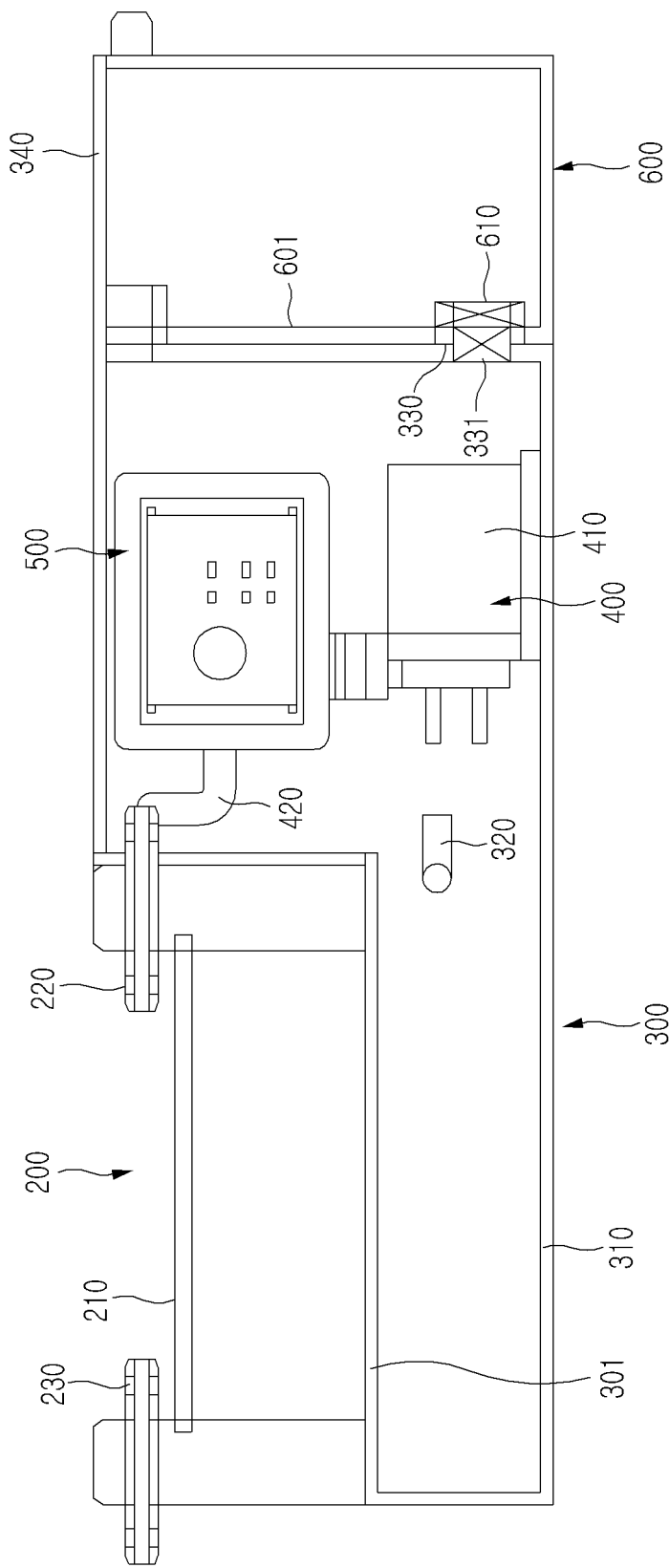
FIG. 3 illustrates a cross-sectional view from a left-hand side of the blood vessel model simulation apparatus 100 in FIG. 1.
Figure 4:
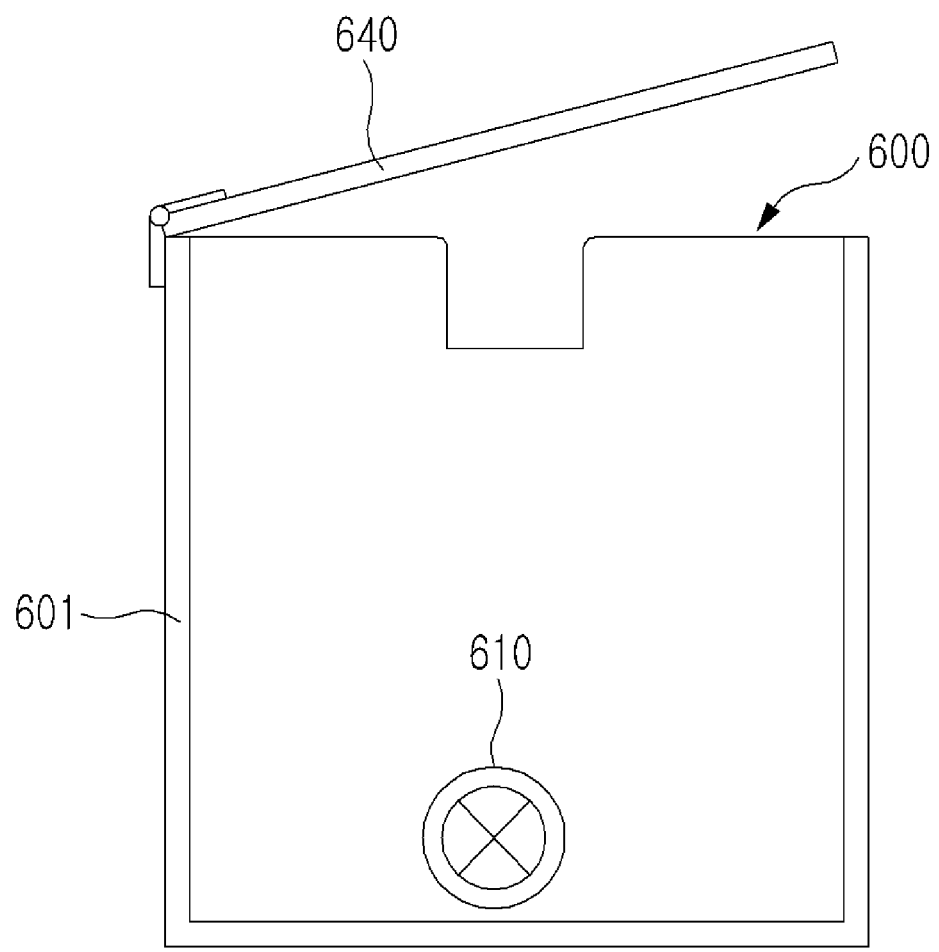
FIG. 4 illustrates a side view of an auxiliary tank unit 600 according to the embodiment of the present invention.

FIG. 1 illustrates a cross-sectional view from top of a blood vessel model simulation apparatus 100 according to an embodiment of the present invention. FIG. 2 illustrates a cross-sectional view from a right-hand side of the blood vessel model simulation apparatus 100 in FIG. 1. FIG. 3 illustrates a cross-sectional view from a left-hand side of the blood vessel model simulation apparatus 100 in FIG. 1. FIG. 4 illustrates a side view of an auxiliary tank unit 600 according to the embodiment of the present invention.

As illustrated in FIGS. 1 to 4, the blood vessel model simulation apparatus 100 according to the embodiment of the present invention includes a blood vessel model mounting unit 200 on which a blood vessel model 10 is mounted to allow a blood-mimicking liquid flow, a blood-mimicking liquid tank unit 300 that is integrally attached to the blood vessel model mounting unit 200 and stores a blood-mimicking liquid which is to be supplied to the blood vessel model 10 mounted on the blood vessel model mounting unit 200, a pump unit 400 that circulates the blood-mimicking liquid stored in the blood-mimicking liquid tank unit 300 via the blood vessel model 10, and a pump control unit 500 that controls drive of the pump unit 400. The units are configured to be integrally coupled to each other.

The blood vessel model mounting unit 200 is configured to include a mount 210 on which the blood vessel model 10 is placed and a supply pipe 220 and a discharge pipe 230 which are coupled to both end portions of the blood vessel model 10 placed on the mount, respectively, and through which a blood-mimicking liquid is supplied to the blood vessel model 10 and a blood-mimicking liquid discharged from the blood vessel model 10 is discharged to the blood-mimicking liquid tank unit 300. Additionally, the blood vessel model mounting unit 200 can be configured to further include a simulation chamber 201 which covers the mount 210, the supply pipe 220, and the discharge pipe 230. Here, the simulation chamber 201 can be manufactured of a transparent material such that a state of the blood vessel model 10, in which a blood-mimicking liquid is circulated, can be observed.

The blood-mimicking liquid tank unit 300 is configured to further include a step portion 301 at which the blood vessel model mounting unit 200 is formed at one side portion of the blood-mimicking liquid tank unit such that the blood vessel model mounting unit 200 and the blood-mimicking liquid tank unit 300 are integrally coupled to each other to form a hexahedron together.

Specifically, the blood-mimicking liquid tank unit 300 is configured to further include a blood-mimicking liquid tank 310 having one side portion at which the step portion 301 is formed so that the blood vessel model mounting unit 200 is integrally mounted on the step portion 301, a collection pipe 320 that receives and collects a blood-mimicking liquid discharged from the blood vessel model 10, and a supplement pipe 330 which is formed on a surface of the blood-mimicking liquid tank 310 to which an auxiliary tank unit 600 is detachably attached such that a blood-mimicking liquid supplemented from the auxiliary tank unit 600 is supplied to the supplement pipe.

In this case, the supplement pipe 330 is configured to further include a supplement-pipe check valve 331 which is mounted to be opened by interacting with the auxiliary tank unit 600, when the auxiliary tank unit 600 is attached or coupled to the blood-mimicking liquid tank 310 in the middle of maintaining a blocked state.

In addition, the blood-mimicking liquid tank unit 300 is configured to further include a tank door 340 for supply of a blood-mimicking liquid or performing maintenance, internal cleaning, or the like of the internal pump unit 400. In the accompanying drawings illustrating the embodiments of the invention of the present application, the tank door 340 is illustrated to be formed at an upper opening portion of the blood-mimicking liquid tank 310 to be opened and closed and illustrated to simultaneously open and close an upper side of the auxiliary tank unit 600; however, the present invention is not limited thereto and can be variously modified and embodied to have an independent door provided to the auxiliary tank unit 600.

The pump unit 400 is configured to be mounted inside the blood-mimicking liquid tank unit 300. As described above, the pump unit 400 is configured to include a pump 410 that circulates a blood-mimicking liquid, and a pump pipe 420 through which the supply pipe 220 of the blood vessel model mounting unit 200 is connected to the pump 410 in order to supply the blood-mimicking liquid, which is supplied by the pump 410, to the blood vessel model 10 mounted on the blood vessel model mounting unit 200. The pump unit 400 configured as described above is mounted inside the blood-mimicking liquid tank unit 300. In this manner, complexity of the external appearance of the blood vessel model simulation apparatus 100 is minimized, and a size thereof can be minimized for ease of portability.

The pump control unit 500 is configured to control the drive of the pump unit 400 so as to control at least one of supply, block, flow speed adjustment, flow rate adjustment, or flow pressure adjustment of the circulated blood-mimicking liquid. Specifically, the pump control unit 500 is configured to include a power switch and a drive speed adjuster of the pump 410 and is configured to control at least one of supply, block, a flow speed, a flow rate, or flow pressure of the circulated blood-mimicking liquid by a user adjusting drive, stop, and a drive speed of the pump 410.

The auxiliary tank unit 600 is configured to supply and supplement a blood-mimicking liquid to the blood-mimicking liquid tank unit 300 through the supplement pipe 330 formed at the blood-mimicking liquid tank unit 300, in order to supplement a blood-mimicking liquid in the blood-mimicking liquid tank unit 300.

The auxiliary tank unit 600 can be configured to be formed integrally with the blood-mimicking liquid tank 310 or be attachable to and detachable from the blood-mimicking liquid tank 310.

In addition, the auxiliary tank unit 600 can be configured to include the upper opening portion which is closed or opened simultaneously by the tank door 340 which closes the upper opening portion of the blood-mimicking liquid tank 310 which configures the blood-mimicking liquid tank unit 300. On the other hand, the auxiliary tank unit 600 can be configured to include an auxiliary tank door 630 which is closed independently from the blood-mimicking liquid tank 310 that configures the blood-mimicking liquid tank unit 300, and the auxiliary tank unit can be configured to be mounted or coupling-attached to the blood-mimicking liquid tank 310 only when needed to supplement or supply a blood-mimicking liquid.

When the auxiliary tank unit 600 is formed integrally with the blood-mimicking liquid tank 310, a valve for supplementing and for blocking supplement of a blood-mimicking liquid of the auxiliary tank unit 600 can be further provided at the supplement pipe 330 or piping connected to the supplement pipe 330.

On the other hand, when the auxiliary tank unit 600 is configured to be attachable to and detachable from the blood-mimicking liquid tank 310, if the auxiliary tank unit 600 is mounted on the blood-mimicking liquid tank 310 through the supplement pipe 330 of the blood-mimicking liquid tank unit 300, the auxiliary tank unit is configured to further include an auxiliary-tank check valve 610 which is opened and closed such that the blood-mimicking liquid tank 310 and the auxiliary tank unit 600 communicate with each other due to interaction with the supplement pipe 330.

As the supplement-pipe check valve 331 and the auxiliary-tank check valve 610, various types of check valves can be applied such as a solenoid valve type check valve, a blocking valve type check valve, or a blocking board type check valve in which the blocking board type check valve is configured of an elastic member and a blocking board and has a structure in which the blocking board is movably supported by the elastic member, is pressed to block an opening portion provided for supply of a blood-mimicking liquid, and opens the opening portion provided for supply of the blood-mimicking liquid when location movement of the blocking board is performed due to an external force.

Figure 5:
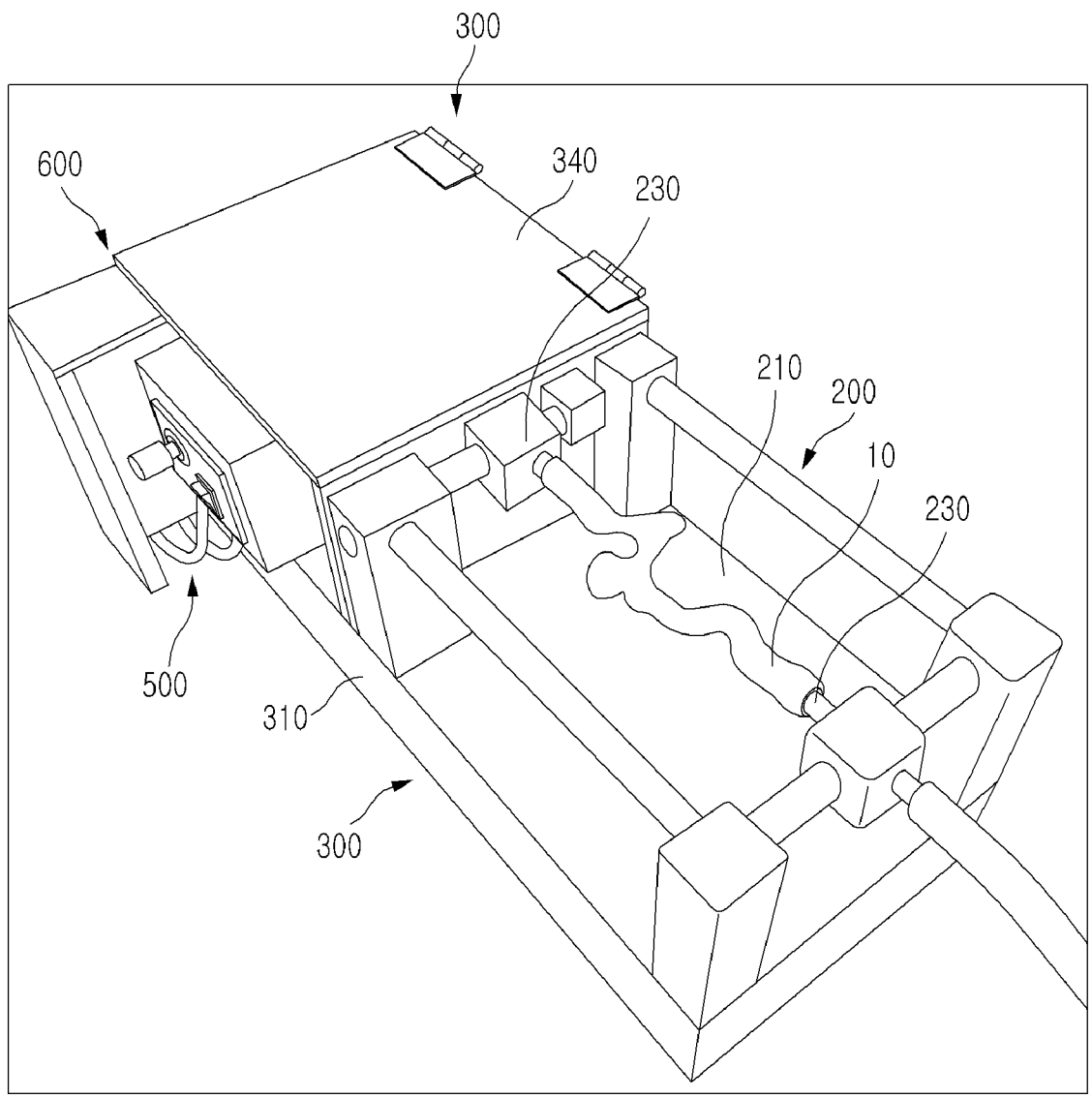
FIG. 5 illustrates a picture of the blood vessel model simulation apparatus 100 according to the embodiment of the present invention which is actually realized.
Figure 6:
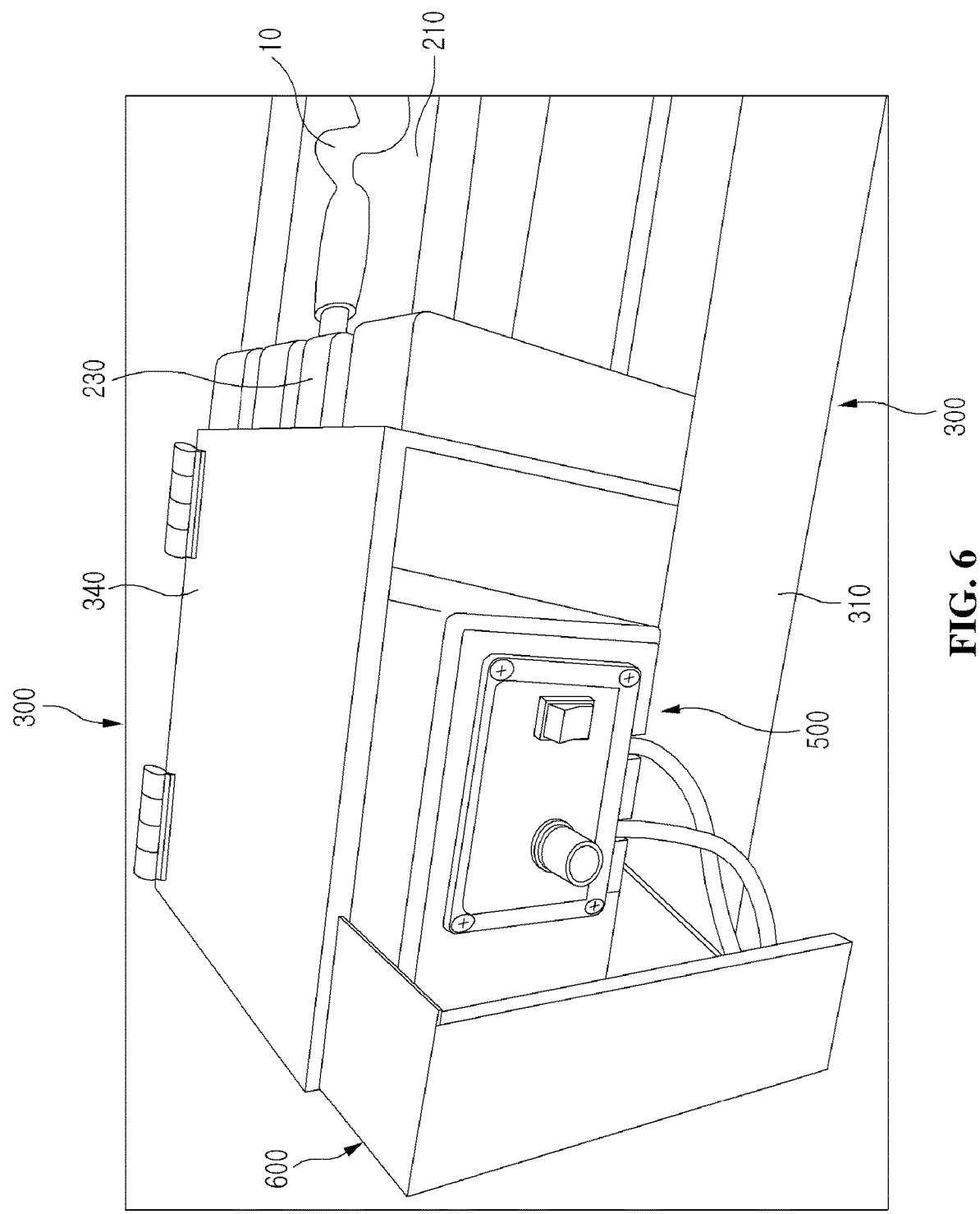
FIG. 6 illustrates a picture specifically showing a pump control unit 500 of the blood vessel model simulation apparatus 100 in FIG. 5.

FIG. 5 illustrates a picture of the blood vessel model simulation apparatus 100 according to the embodiment of the present invention which is actually realized. FIG. 6 illustrates a picture specifically showing the pump control unit 500 of the blood vessel model simulation apparatus 100 in FIG. 5.

As illustrated in FIGS. 5 and 6, in the blood vessel model simulation apparatus, piping is connected such that the pump unit 400 circulates the blood-mimicking liquid in the blood vessel model 10 and the blood-mimicking liquid tank unit 300.

Specifically, the pump pipe 420 of the pump unit 400 penetrates the blood-mimicking liquid tank 310 and is connected to the supply pipe 220 of the blood vessel model mounting unit 200 located at an inner side of the blood-mimicking liquid tank 310. Besides, one end portion of the blood vessel model 10 is coupled to an end portion of the supply pipe 220 located inside the blood vessel model mounting unit 200, and the other end portion of the blood vessel model 10 is coupled to an end portion of the discharge pipe 230 located inside the blood vessel model mounting unit 200. In addition, an end portion of the discharge pipe 230 located outside the blood vessel model mounting unit 200 is connected to the collection pipe 320 of the blood-mimicking liquid tank unit 300 through separate piping, and thereby a blood-flow circulating channel of the blood-mimicking liquid is configured.

When the present invention is configured as described above and a user controls the drive of the pump 410 by the pump control unit 500, a simulation in a desired manner can be performed on the blood vessel model by performing an adjustment operation of a blood flow rate, a blood flow speed, blood pressure, or the like in the blood vessel model 10.

The blood vessel model simulation apparatus manufactured as a test product illustrated in FIGS. 5 and 6 was able to be manufactured to have a minimized size with a width of 40 cm, a length of 15 cm, and a height of 16 cm. Hence, the blood vessel model simulation apparatus was portable using a bag having a size of about 40 cm, demonstrating remarkable improvement in the portability and usability.

The technical idea of the present invention described above is specifically described in the preferred embodiment; however, note that the embodiment is provided for the description and is not provided to limit the present invention thereto. In addition, it is possible for a person of ordinary knowledge in the technical field of the present invention to make various embodiments within the scope of the invention of the present application. Consequently, an actual scope of technical protection of the present invention is to be determined based on technical ideas of the accompanying claims.

REFERENCE SIGNS LIST

100: Blood Vessel Model Simulation Apparatus
200: Blood Vessel Model Mounting Unit
201: Simulation Chamber
210: Mount
220: Supply Pipe
230: Discharge Pipe
300: Blood-Mimicking Liquid Tank Unit
301: Step Portion
310: Blood-Mimicking Liquid Tank
320: Collection Pipe
330: Supplement Pipe
331: Supplement-Pipe Check Valve
340: Tank Door
400: Pump Unit
410: Pump
420: Pump Pipe
500: Pump Control Unit
600: Auxiliary Tank Unit
601: Auxiliary Tank
610: Auxiliary-Tank Check Valve
640: Auxiliary-Tank Door

The invention claimed is:

1. A blood vessel model simulation apparatus comprising:
a blood vessel model mounting container on which a blood vessel model is mounted to allow a blood-mimicking liquid flow;
a blood-mimicking liquid storage integrally attached to the blood vessel model mounting container, the blood-mimicking liquid storage being configured to store a blood-mimicking liquid which is to be supplied to the blood vessel model mounted on the blood vessel model mounting container;
a pump configured to circulate the blood-mimicking liquid stored in the blood-mimicking liquid storage, via the blood vessel model; and
a pump controller configured to control drive of the pump,
wherein the blood vessel model mounting container, the blood-mimicking liquid storage, the pump, and the pump controller together have an integrated structure, and
wherein the blood-mimicking liquid storage has a step portion defined at one side portion of the blood-mimicking liquid storage, wherein the blood vessel model mounting container is disposed on the step portion in a manner that the blood vessel model mounting container and the blood-mimicking liquid storage together define a hexahedron shape.

2. The blood vessel model simulation apparatus according to claim 1,
wherein the pump is mounted inside the blood-mimicking liquid storage.

3. The blood vessel model simulation apparatus according to claim 1,
wherein the pump controller is configured to control the drive of the pump to control at least one of supply, block, flow speed adjustment, flow rate adjustment, or flow pressure adjustment of the blood-mimicking liquid.

4. The blood vessel model simulation apparatus according to claim 1, further comprising:
an auxiliary tank configured to supply and supplement a second blood-mimicking liquid to the blood-mimicking liquid storage through a supplement pipe disposed at the blood-mimicking liquid storage in order to supplement the second blood-mimicking liquid to the blood-mimicking liquid storage.

5. The blood vessel model simulation apparatus according to claim 4,
wherein the auxiliary tank is configured to attach to and detach from the blood-mimicking liquid storage.

6. The blood vessel model simulation apparatus according to claim 5,
wherein the auxiliary tank has an upper opening portion configured to be closed or opened by a tank door, wherein the tank door is configured to simultaneously close or open the upper opening portion of the auxiliary tank and an upper opening portion of a blood-mimicking liquid tank.

7. The blood vessel model simulation apparatus according to claim 5,
wherein the auxiliary tank has an auxiliary tank door which is configured to be closed independently from a blood-mimicking liquid tank, and the auxiliary tank is configured to be mounted or attached to the blood-mimicking liquid tank to supplement and supply the second blood-mimicking liquid only when the second blood-mimicking liquid is needed.

8. The blood vessel model simulation apparatus according to claim 5,
wherein the supplement pipe has a check valve and the auxiliary tank has a check valve, wherein the check valve of the supplement pipe and the check valve of the auxiliary tank are configured to be opened and closed to allow communication between the blood-mimicking liquid storage and the auxiliary tank when the auxiliary tank is attached to the blood-mimicking liquid storage through the supplement pipe.

* * * * *